United States Patent
Huang et al.

(10) Patent No.: US 10,817,452 B2
(45) Date of Patent: Oct. 27, 2020

(54) BUS SYSTEM AND DETECTION METHOD THEREOF

(71) Applicant: Nuvoton Technology Corporation, Hsinchu (TW)

(72) Inventors: Chih-Hung Huang, New Taipei (TW); Chun-Wei Chiu, New Taipei (TW); Hao-Yang Chang, Miaoli County (TW)

(73) Assignee: NUVOTON TECHNOLOGY CORPORATION, Hsinchu Science Park (TW)

( * ) Notice: Subject to any disclaimer, the term of this patent is extended or adjusted under 35 U.S.C. 154(b) by 0 days.

(21) Appl. No.: 16/398,653

(22) Filed: Apr. 30, 2019

(65) Prior Publication Data

US 2019/0361832 A1 Nov. 28, 2019

(30) Foreign Application Priority Data

May 24, 2018 (TW) .............................. 107117729 A

(51) Int. Cl.
*G06F 13/40* (2006.01)
*G06F 13/42* (2006.01)

(52) U.S. Cl.
CPC ...... *G06F 13/4063* (2013.01); *G06F 13/4282* (2013.01)

(58) Field of Classification Search
CPC .................... G06F 13/4063; G06F 13/4282
See application file for complete search history.

(56) References Cited

U.S. PATENT DOCUMENTS

| 5,359,235 A | 10/1994 | Coyle et al. |
| 5,528,168 A | 6/1996 | Kleveland |
| 6,788,101 B1 | 9/2004 | Rahman |
| 7,603,501 B2 * | 10/2009 | Hsieh .................. G06F 13/4291 710/110 |
| 8,154,901 B1 | 4/2012 | Lee |
| 2008/0299819 A1 * | 12/2008 | Kakutani ............... B41J 29/393 439/489 |
| 2009/0157929 A1 * | 6/2009 | Pigott ................. G06F 13/4291 710/110 |

(Continued)

FOREIGN PATENT DOCUMENTS

TW     I567561 B    1/2017

OTHER PUBLICATIONS

Intel, "Enhanced Serial Peripheral Interface (eSPI) Specification," Jan. 2016, Revision 1.0 (Year: 2016).*

(Continued)

*Primary Examiner* — Tim T Vo
*Assistant Examiner* — Phong H Dang
(74) *Attorney, Agent, or Firm* — Muncy, Geissler, Olds & Lowe, PC

(57) ABSTRACT

A bus system is provided. The bus system includes a master device, an enhanced serial peripheral interface (eSPI) bus, a plurality of slave devices electrically connected to the master device via the eSPI bus, and a first resistor. Each slave device has an alert handshake pin. The alert handshake pins of the slave devices are electrically connected together via an alert handshake control line. The first resistor is coupled between the alert handshake control line and a power supply. Each slave device obtains the number of slave devices according to a first voltage of the alert handshake control line.

10 Claims, 3 Drawing Sheets

(56) References Cited

U.S. PATENT DOCUMENTS

| | | | |
|---|---|---|---|
| 2011/0029705 A1* | 2/2011 | Evans | G06F 13/4291 |
| | | | 710/110 |
| 2014/0237177 A1* | 8/2014 | Yu | G11C 11/40607 |
| | | | 711/106 |
| 2015/0316974 A1* | 11/2015 | Jeon | G06F 1/3212 |
| | | | 710/110 |
| 2016/0244002 A1* | 8/2016 | Berg | B60L 50/72 |
| 2017/0153997 A1* | 6/2017 | Chiu | G06F 13/1642 |

OTHER PUBLICATIONS

Taiwanese Office Action dated Jan. 15, 2020 for corresponding application No. 107117729; pp. 1-9.

* cited by examiner

BUS SYSTEM AND DETECTION METHOD THEREOF

CROSS REFERENCE TO RELATED APPLICATIONS

This application claims priority of Taiwan Patent Application No. 107117729, filed on May 24, 2018, the entirety of which is incorporated by reference herein.

BACKGROUND OF THE INVENTION

Field of the Invention

The invention relates to a bus system, and more particularly to a bus system with a plurality of slave devices.

Description of the Related Art

In a conventional computer system, a chip set such as a south bridge chip is electrically connected to the other external circuit module (such as a system-on-a-chip (SoC) with various functions) through a low pin count (LPC) interface. The external circuit modules coupled through the LPC interface are respectively assigned to different independent addresses. As a result, the south bridge chip can communicate with the external circuit modules by one-to-many communication. However, in recent years, an aspect of the new bus architectures, such as an enhanced serial peripheral interface (eSPI) bus, began only allowing a one-to-one communication mechanism to be employed between the chip set and the external circuit modules.

Therefore, it is necessary to know how many circuit modules share the bus, so as to schedule the circuit modules electrically connected to the chip set.

BRIEF SUMMARY OF THE INVENTION

Bus systems and a detection method thereof are provided. An embodiment of a bus system is provided. The bus system includes a master device, an enhanced serial peripheral interface (eSPI) bus, a plurality of slave devices electrically connected to the master device via the eSPI bus, and a first resistor. Each slave device has an alert handshake pin. The alert handshake pins of the slave devices are electrically connected together via an alert handshake control line. The first resistor is coupled between the alert handshake control line and a power supply. Each slave device obtains the number of slave devices according to a first voltage of the alert handshake control line.

Furthermore, another embodiment of a bus system is provided. The bus system includes a master device, an enhanced serial peripheral interface (eSPI) bus, a plurality of slave devices electrically connected to the master device through the eSPI bus, and a pull-up resistor. Each of the slave devices includes an alert handshake pin, and a pull-down resistor coupled between the alert handshake pin and a ground. The pull-up resistor coupled between the alert handshake pins of the slave devices and a power supply. Each of the slave devices obtains the number of slave devices according to a current with a first current value flowing through the pull-down resistor.

Moreover, an embodiment of a detection method for detecting the total number of slave devices in a bus system is provided. The bus system further includes a pull-up resistor and a master device electrically connected to the slave devices through an enhanced serial peripheral interface (eSPI) bus. A voltage or a current of an alert handshake pin of the slave device is measured, wherein the alert handshake pin of each of the slave devices is electrically connected to a power supply through the pull-up resistor, and the current is flowing from the alert handshake pin to a pull-down resistor of the slave device. The total number of slave devices is obtained according to the voltage or the current of the alert handshake pin, resistance values of the pull-up resistor and the pull-down resistor, and the voltage value of the power supply.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
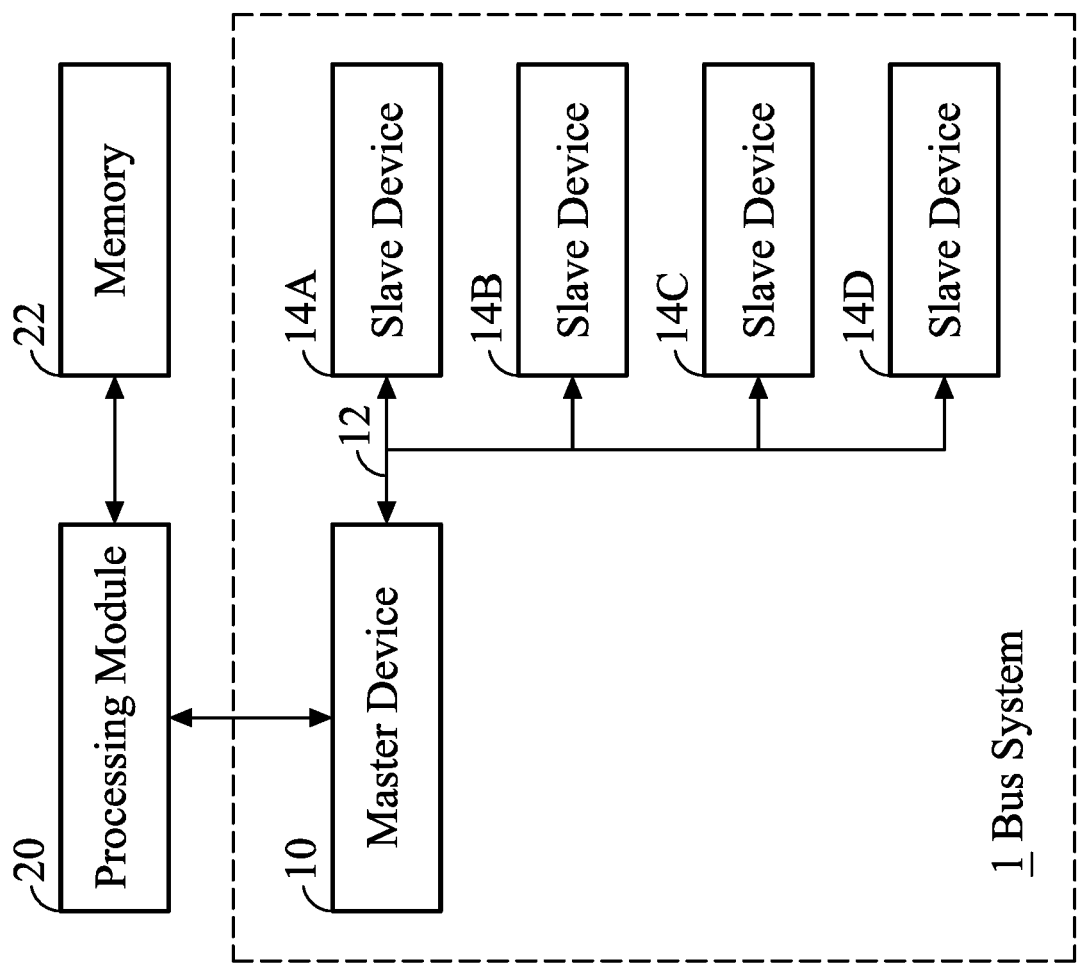
FIG. 1 shows a bus system according to an embodiment of the invention.

FIG. 1 shows a bus system 1 according to an embodiment of the invention. The bus system 1 includes a master device 10, a bus 12 and a plurality of slave devices 14A-14D. In some embodiments, the master device 10 may be a south bridge chip.

In some embodiments, the master device 10 is electrically connected to a processing module 20 of a computer system (not shown), so as to perform data access with the slave devices 14A through 14D through the bus 12 in response to the commands of the processing module 20. In some embodiments, the processing module 20 is electrically connected to a memory 22 of the computer system, so as to access the memory 22 according to the requests of different application programs.

In some embodiments, the bus 12 is an enhanced serial peripheral interface (eSPI) bus. In the bus system 1, the master device 10 is electrically connected to the slave devices 14A through 14D via the bus 12. Furthermore, the master device 10 can perform one-to-one communication only, and the slave devices 14A-14D can obtain the right to actively communicate with the master device 10 by using a handshake mechanism which is also called an arbitration mechanism. It should be noted that the number of slave devices 14A through 14D as illustrated is used as an example, and not to limit the invention.

Figure 2:
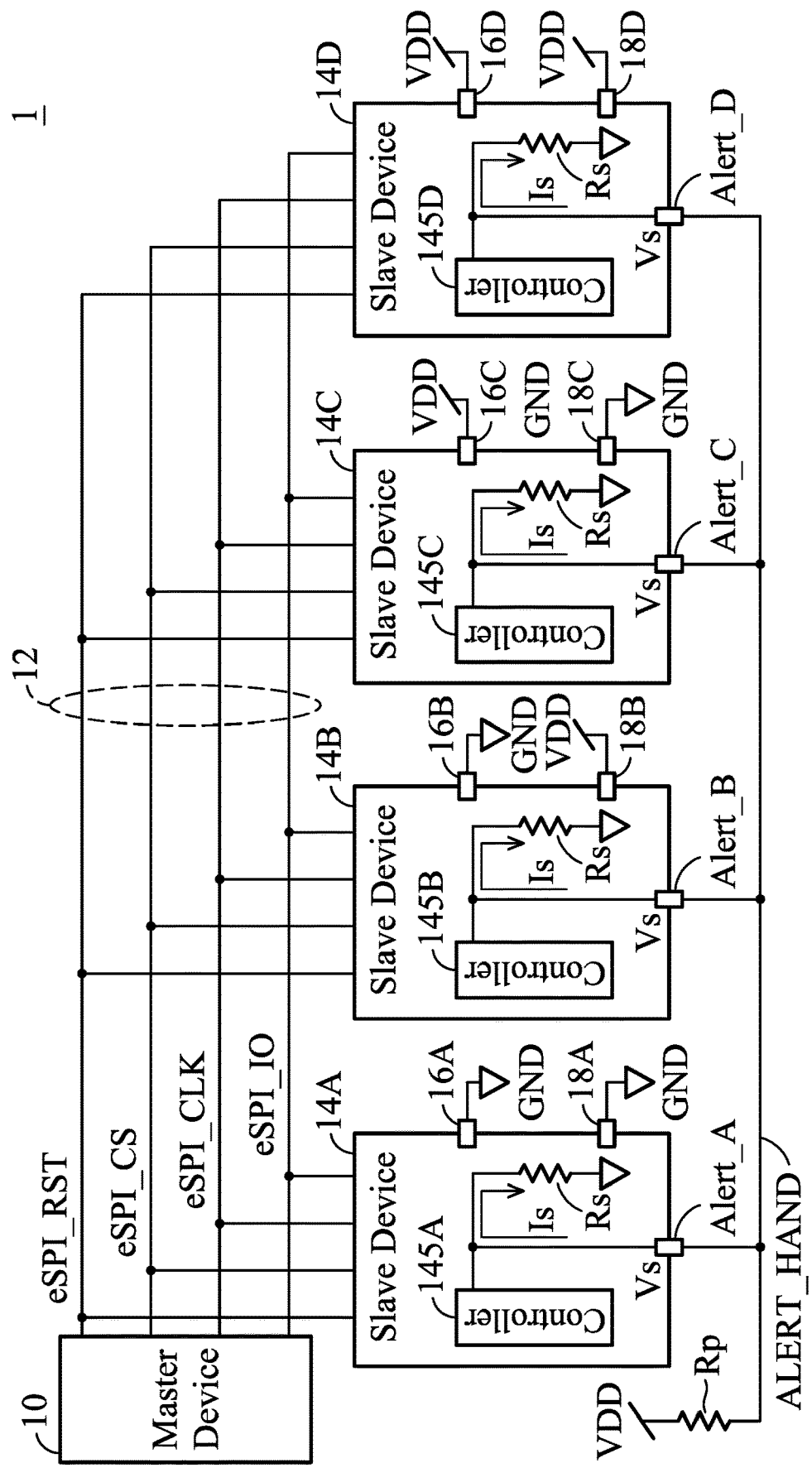
FIG. 2 shows the connection configuration of the bus system in FIG. 1 according to an embodiment of the invention.

FIG. 2 shows the connection configuration of the bus system 1 in FIG. 1 according to an embodiment of the invention. In the embodiment, the bus 12 includes a reset signal line eSPI_RST, a chip select signal line eSPI_CS, a clock signal eSPI_CLK and an input and output signal line eSPI_IO. The master device 10 has a chip select port connected to the chip select signal line eSPI_CS, and an IO port connected to the input and output signal line eSPI_IO. The master device 10 can trigger the chip select signal line eSPI_CS to start the one-to-one communication through the input and output signal line eSPI_IO. Furthermore, based on the handshake mechanism, one of the slave devices 14A-14D can actively communicate with the master device 10 (e.g., transmitting data and commands) through the input and output signal line eSPI_IO, and make the other slave device not respond to the master device 10. When the master device 10 communicates with the slave devices 14A-14D through the bus 12, the clock signal eSPI_CLK is used as a reference clock.

In general, according to the operation mechanism of the chip select signal line eSPI_CS, the master device 10 can only communicate with one slave device through the input and output signal line eSPI_IO. However, in the bus system 1, only one of the slave devices 14A-14D is able to respond to the master device 10 at a time slot based on the handshake mechanism. Therefore, even the master device 10 is connected to multiple slave devices through the bus 12, the master device 10 can still operate with a one-to-one communication mechanism, and the bus 12 can connect the slave devices 14A-14D to perform communication tasks in response to the chip select signal line eSPI_CS, thereby increasing the expandability of the bus system 1.

In an embodiment, the master device 10 can have only one chip select port, and the only one chip select port is connected to multiple slave devices through the single chip select signal line of the bus 12. In an embodiment, the master device 10 can have at least two chip select ports, and the at least two chip select ports are separately connected to different groups of slave devices through the at least two chip select signal lines of the bus 12. For example, the master device 10 can have a first chip select port and a second chip select port, and the first chip select port is connected to the first and second slave devices through a first chip select signal lines of the bus, and the second chip select port is connected to the third and fourth slave devices through a second chip select signal lines of the bus.

It should be noted that, in the bus system of the present invention, the master device does not have the information about the amount of the slave device connected thereto, so the master device is unable to perform communication by using the ID of one of the slave devices.

In an embodiment, the slave devices can comprise only one primary slave device and at least one secondary slave device, and the slave devices are assigned to have a plurality address sections different from each other. when the master device 10 triggers the chip select signal line eSPI_CS to start the one-to-one communication through the input output signal line eSPI_IO and none of the plurality of slave devices wants to actively communicate with the master device, the only one primary slave device is in charge of response to the master device 10. For example, when the bus system is initially activated, the only one primary slave device is in charge of response to the master device in an initial state, and after the initial state, any one of the slave devices is able to communicate with the master device.

In FIG. 2, the slave devices 14A through 14D include the address section select pin 18A through 18D, the address entry select pin 16A through 16D and the alert handshake pins Alert_A through Alert_D. The addresses corresponding to the slave devices 14A through 14D can be assigned according to a combination of the voltage levels received by the address section select pins 18A through 18D and the address entry select pins 16A through 16D, so that the slave devices 14A through 14D can have different address sections.

As shown in FIG. 2, the slave devices 14A-14D of the present invention can have the same pin configurations, and the primary slave device and secondary slave device also have the same pin configurations, so that the chip manufacturer can produce the same chips to serve as the slave devices, the primary slave device and the secondary slave device, thereby reducing the cost of the slave device and burden in stock.

In FIG. 2, the address section select pins 18A and 18C of the slave devices 14A and 14C are coupled to a ground GND, so as to correspond to a first address section. The address entry select pins 16A and 16C are coupled to the ground GND and a power supply VDD, so as to respectively correspond to the different address entry codes: for example, they may respectively correspond to a first address and a second address of the first address section. Furthermore, the address section select pins 18B and 18D of the slave devices 14B and 14D are coupled to the power supply VDD, so as to correspond to a second address section. The address entry select pins 16B and 16D are coupled to the ground GND and the power supply VDD, so as to respectively correspond to the different address entry codes. For example, they may respectively correspond to a first address and a second address of the second address section. In the embodiment, the connection configuration of the address entry select pins 16A through 16D and the address section select pins 18A through 18D is used as an example and is not intended to limit the invention.

In FIG. 2, the alert handshake pins Alert_A through Alert_D of the slave devices 14A through 14D are electrically connected to the alert-handshake control line ALERT_HAND. In the embodiment, the alert-handshake control line ALERT_HAND is electrically connected to the power supply VDD through a resistor Rp, so that the alert-handshake control line ALERT_HAND is at a high-voltage level. In the embodiment, the resistor Rp is a pull-up resistor. Furthermore, the controllers 145A through 145D of the slave devices 14A through 14D can pull the corresponding alert handshake pins Alert_A through Alert_D to a low-voltage level for driving the alert-handshake control line ALERT_HAND, so that the alert-handshake control line ALERT_HAND is at a low-voltage level. Thus, each of the slave devices 14A through 14D can obtain the right to actively communicate with the master device 10 by controlling the voltage level of the alert-handshake control line ALERT_HAND, and also make the other slave devices not respond to the master device 10. The alert handshake pins Alert_A through Alert_D are the bi-directional input/output (bi-directional input/output) pins, and the alert handshake pins Alert_A through Alert_D are operating as an open drain in the output mode.

In each of the slave devices 14A through 14D, a resistor Rs is coupled between the corresponding alert handshake pins Alert_A through Alert_D and the ground GND. In the embodiment, the resistor Rs is a pull-down resistor. Taking the slave device 14A as an example, the resistor Rs is disposed in the slave device 14A and coupled between the alert handshake pin Alert_A and the ground GND. It should be noted that the resistors Rs of the slave devices 14A through 14D have the same resistance value.

In the slave devices 14A through 14D, the controllers 145 through 145D are capable of detecting the voltage Vs corresponding to the high voltage value of the alert-handshake control line ALERT_HAND through the corresponding alert handshake pins Alert_A through Alert_D, to obtain the total number n of slave devices 14A through 14D. After obtaining the total number n of slave devices 14A through 14D, the controllers 145A through 145D of the slave devices 14A through 14D are capable of monitoring whether the alert-handshake control line ALERT_HAND is driven to a low-voltage level according to a scheduling manner corresponding to the total number n.

In the bus system 1, the resistor devices Rs of the slave devices 14A through 14D are connected in parallel between the alert-handshake control line ALERT_HAND and the ground GND. Thus, the controllers 145A through 145D are capable of obtaining the total number n of slave devices 14A through 14D according to the following formula (1):

$$V_S = \left(\frac{\frac{Rs}{n}}{Rp + \frac{Rs}{n}}\right) VDD \Rightarrow n = \frac{Rs}{Rp}\left(\frac{VDD}{Vs} - 1\right), \quad (1)$$

where VDD represents the voltage of the power supply VDD, Vs represents a high voltage value of the alert-handshake control line ALERT_HAND detected through the alert handshake pins Alert_A through Alert_D, and Rs and Rp represent the resistance values of the resistor Rs and the resistor Rp, respectively. Moreover, the voltage Vs of the alert-handshake control line ALERT_HAND is lower than the voltage of the power supply VDD.

As described above, when the alert-handshake control line ALERT_HAND has not driven by the slave devices 14A through 14D, the voltage Vs of the alert-handshake control line ALERT_HAND is determined by the resistor Rp and the n resistors Rs connected in parallel (e.g., Rp and the divided voltage of Rs/n). Based on the detected voltage Vs of the alert-handshake control line ALERT_HAND, each of the slave devices 14A through 14D is capable of obtaining the total number n of slave devices 14A through 14D (e.g., n=4). After obtaining the total number n of slave devices 14A through 14D, the controllers 145A through 145D of the slave devices 14A through 14D are capable of monitoring whether the alert-handshake control line ALERT_HAND is driven to a low voltage level according to the scheduling manner corresponding to the total number n. In some embodiments, the low voltage value is a grounding level. In addition, when the alert-handshake control line ALERT_HAND is driven by one of the slave devices 14A through 14D, the one of the slave devices 14A-14D can communicate with the master device 10 through the bus 12.

In addition to measuring the voltage Vs of the alert-handshake control line ALERT_HAND, each of the slave devices 14A through 14D is also capable of obtaining the total number n of slave devices 14A through 14D by measuring the current Is from the alert-handshake control line ALERT_HAND to the resistor Rs through the corresponding alert handshake pins Alert_A through Alert_D, as shown by the following formula (2):

$$n = \frac{Rs}{Rp}\left(\frac{VDD}{Vs} - 1\right) \quad (2)$$
$$= \frac{Rs}{Rp}\left(\frac{VDD}{Is \times Rs} - 1\right)$$
$$= \frac{1}{Rp}\left(\frac{VDD}{Is} - Rs\right).$$

In some embodiments, the controllers 145A through 145D of the slave devices 14A through 14D are capable of determining whether the master device 10 is communicating with one of the slave devices 14A through 14D by detecting the current value of the current Is flowing from the alert handshake pins Alert_A through Alert_D to the resistor Rs. For example, when the alert-handshake control line ALERT_HAND is not driven by the slave devices 14A through 14D (i.e., the alert-handshake control line ALERT_HAND has a high voltage value), the current Is measured by the controllers 145A through 145D of the slave devices 14A through 14D has a first current value corresponding to the voltage Vs of the high voltage value. Conversely, when the alert-handshake control line ALERT_HAND is driven by one of the slave devices 14A through 14D (i.e., the alert-handshake control line ALERT_HAND has a low voltage value), the current Is measured by the controllers 145A through 145D of the slave devices 14A through 14D has a second current value corresponding to the voltage Vs of a low voltage value, wherein the second current value is lower than the first current value. In some embodiments, the second current value is close to zero.

Figure 3:
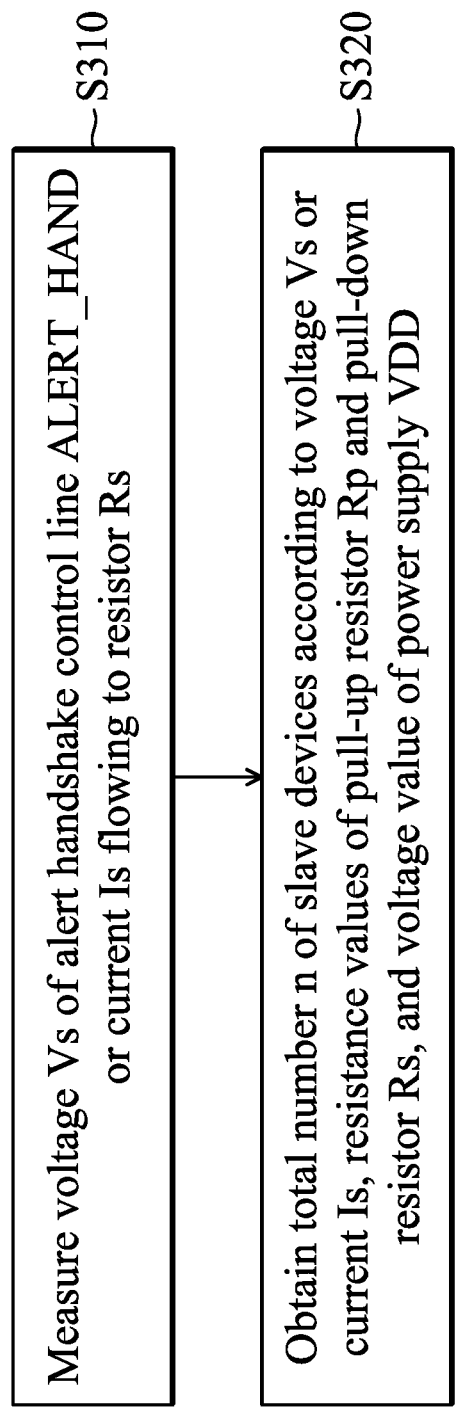
FIG. 3 shows a detection method for detecting the total number of slave devices in the bus system according to an embodiment of the invention.

FIG. 3 shows a detection method for detecting the total number of slave devices in the bus system according to an embodiment of the invention. The detection method of FIG. 3 can be performed by the controllers 145A through 145D of the slave devices 14A through 14D in the bus system 1.

As described above, the alert handshake pin of each slave device in the bus system is electrically connected to the alert-handshake control line ALERT_HAND. Furthermore, the alert-handshake control line ALERT_HAND is electrically connected to the power supply VDD through the pull-up resistor Rp. Moreover, in each slave device, the alert handshake pin Alert is electrically connected to the ground GND through a pull-down resistor Rs. In the bus system, the pull-down resistors Rs in the slave devices have the same resistance value.

First, in step S310, the controllers of the slave devices (e.g., the controllers 145A through 145D of FIG. 2) are capable of measuring the voltage Vs of the alert-handshake control line ALERT_HAND through the corresponding alert handshake pins (e.g., Alert_A through Alert_D), or measure the current Is flowing from the alert-handshake control line ALERT_HAND to the resistor Rs.

Next, in step S320, the controllers obtain the total number n of slave devices according to the voltage Vs or the current Is, the resistance values of the pull-up resistor Rp and the pull-down resistor Rs, and the voltage value of the power supply VDD. As described above, in response to the measured voltage Vs of the alert handshake pin, the controllers are capable of obtaining the total number n of slave devices according to the formula (1). In addition, in response to the measured current Is of the alert handshake pin, the controllers are capable of obtaining the total number n of slave devices according to the formula (2).

In some embodiments, the resistance values of the pull-up resistor Rp and the pull-down resistor Rs, and the voltage value of the power supply VDD are stored in advance in the memory of each slave device.

In some embodiments, when the slave device is powered on or reset, the controller performs the detection method of FIG. 3 in an initial stage. In some embodiments, the controller continues to perform the detection method of FIG. 3 during the normal operation. Therefore, when other slave device is added into the bus system (that is, the number of slave devices is expanded), the original slave devices can immediately detect that the total number of slave devices has changed and obtain the updated total number n for subsequent operations. For example, a scheduling manner corresponding to the updated total number n is used to monitor whether the alert-handshake control line ALERT_HAND is driven.

For each slave device of the bus system, each slave device is capable of obtaining the total number n of all slave devices in the bus system by measuring the voltage or current of the alert handshake pin thereof, That is, the number of slave devices sharing the bus 12 in the bus system. Therefore, the total number n of slave devices can be correctly obtained without adding additional pins. Furthermore, according to the total number n of slave devices, each slave device of the bus system can perform a scheduling operation corresponding to the total number n, so as to monitor whether the alert-handshake control line ALERT_HAND is driven or executed other applications.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A bus system, comprising:
a master device;
an enhanced serial peripheral interface (eSPI) bus;
a plurality of slave devices electrically connected to the master device through the eSPI bus, wherein each of the slave devices comprises an alert handshake pin, and the alert handshake pins of the slave devices are electrically connected together through an alert handshake control line; and
a first resistor coupled between the alert handshake control line and a power supply,
wherein each of the slave devices obtains the number of slave devices according to a first voltage of the alert handshake control line,
wherein when the number of slave devices is updated, each of the slave devices uses a scheduling manner corresponding to the updated number of slave devices to detect whether the alert handshake control line is driven.

2. The bus system as claimed in claim 1, wherein each of the slave devices detects whether the alert handshake control line has a second voltage to determine whether the master device communicates with one of the slave devices.

3. The bus system as claimed in claim 2, wherein the first voltage is lower than a voltage of the power supply, and the second voltage is lower than the first voltage.

4. The bus system as claimed in claim 1, wherein each of the slave devices further comprises:
a second resistor coupled between the alert handshake pin and a ground.

5. A bus system, comprising:
a master device;
an enhanced serial peripheral interface (eSPI) bus;
a plurality of slave devices electrically connected to the master device through the eSPI bus, wherein each of the slave devices comprises:
an alert handshake pin; and
a pull-down resistor coupled between the alert handshake pin and a ground; and
a pull-up resistor coupled between the alert handshake pins of the slave devices and a power supply,
wherein each of the slave devices obtains the number of slave devices according to a current with a first current value flowing through the pull-down resistor,
wherein when the number of slave devices is updated, each of the slave devices uses a scheduling manner corresponding to the updated number of slave devices to detect the current flowing through the pull-down resistor.

6. The bus system as claimed in claim 5, wherein the pull-down resistors of the slave devices have the same resistance value.

7. The bus system as claimed in claim 5, wherein each of the slave devices detects the current flowing from the alert handshake pin to the pull-down resistor, so as to determine whether the master device communicates with one of the slave devices.

8. The bus system as claimed in claim 7, wherein when the slave device detects that the current has the first current value, the slave device determines that no slave device communicates with the master device.

9. A detection method for detecting total number of slave devices in a bus system, wherein the bus system further comprises a pull-up resistor and a master device electrically connected to the slave devices through an enhanced serial peripheral interface (eSPI) bus, the detection method comprising:
measuring a voltage or a current of an alert handshake pin of the slave device, wherein the alert handshake pin of each of the slave devices is electrically connected to a power supply through the pull-up resistor, and the current is flowing from the alert handshake pin to a pull-down resistor of the slave device;
obtaining the total number of slave devices according to the voltage or the current of the alert handshake pin, resistance values of the pull-up resistor and the pull-down resistor, and voltage value of the power supply, and
when detecting the total number of slave devices is updated, detecting the voltage or the current of the alert handshake pin with a scheduling manner corresponding to the updated total number of slave devices by each of the slave devices.

10. The detection method as claimed in claim 9, wherein the pull-down resistors of the slave devices have the same resistance value.

* * * * *